US011225399B2

(12) United States Patent
Ye et al.

(10) Patent No.: US 11,225,399 B2
(45) Date of Patent: Jan. 18, 2022

(54) ESCALATOR MONITORING SYSTEM, METHOD, SOUND DATA COLLECTION DEVICE AND FIXTURE THEREFOR

(71) Applicant: KONE CORPORATION, Helsinki (FI)

(72) Inventors: Tao Ye, Kunshan (CN); Wenke Deng, Kunshan (CN); Chao Zhang, Kunshan (CN)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 16/769,772

(22) PCT Filed: Dec. 29, 2017

(86) PCT No.: PCT/CN2017/119810
§ 371 (c)(1),
(2) Date: Jun. 4, 2020

(87) PCT Pub. No.: WO2019/127359
PCT Pub. Date: Jul. 4, 2019

(65) Prior Publication Data
US 2020/0385239 A1    Dec. 10, 2020

(30) Foreign Application Priority Data

Dec. 29, 2017  (CN) .......................... 201711479430.6
Dec. 29, 2017  (CN) .......................... 201711498108.8
Dec. 29, 2017  (CN) .......................... 201711498149.7

(51) Int. Cl.
*B66B 25/00*  (2006.01)
*B66B 29/00*  (2006.01)
*G06F 17/17*  (2006.01)

(52) U.S. Cl.
CPC ............ *B66B 29/005* (2013.01); *G06F 17/17* (2013.01)

(58) Field of Classification Search
None
See application file for complete search history.

(56) References Cited

U.S. PATENT DOCUMENTS 5,785,165 A * 7/1998 Stahlhut .................. B66B 25/00
                                                       198/322
6,334,522 B2 * 1/2002 Haruta .................... B66B 25/00
                                                       198/322

(Continued)

FOREIGN PATENT DOCUMENTS

CN    101239689 A    8/2008
CN    101624159 A    1/2010

(Continued)

OTHER PUBLICATIONS

English translations of the International Search Report and Written Opinion of the International Searching Authority, dated Sep. 30, 2018, for International Application No. PCT/CN2017/119810.
Supplermentary European Search Report of Application No. EP 17335325 dated Jan. 11, 2021.

*Primary Examiner* — Kavel Singh
(74) *Attorney, Agent, or Firm* — Birch, Stewart, Kolasch & Birch, LLP

(57) ABSTRACT

The present invention discloses an escalator monitoring system, which includes a data collection device disposed near the parts of the escalator that require monitoring in order to collect data the parts relevant to the operation of the escalator, a data transmittal device used to send the collected data, a cloud processor used to receive the data, to compare the data against threshold data of the parts obtained under normal operating conditions stored in the database of the cloud processor, and to respond based on the comparison result. The present invention can collect the data and analyze (Continued)

it in any environment independent of subjective human judgment, predict possible failure without the need to stop the operation of the escalator, save maintenance time, reduce associated cost, and thus improve its safety and ride comfort.

9 Claims, 14 Drawing Sheets

(56) References Cited

U.S. PATENT DOCUMENTS

| | | |
|---|---|---|
| 2010/0030523 A1 | 2/2010 | Murao et al. |
| 2010/0094798 A1 | 4/2010 | Shudo et al. |
| 2011/0106490 A1 | 5/2011 | Idemori et al. |
| 2014/0124329 A1* | 5/2014 | Kleine-Bruggeney ...................... B66B 29/00 198/333 |

FOREIGN PATENT DOCUMENTS

| | | |
|---|---|---|
| CN | 101638203 A | 2/2010 |
| CN | 104176613 A | 12/2014 |
| CN | 104444750 A | 3/2015 |
| CN | 105502115 A | 4/2016 |
| CN | 106586796 A | 4/2017 |
| CN | 206457141 U | 9/2017 |
| DE | 102011009362 A1 | 8/2011 |
| JP | 2009012891 A * | 1/2009 |

* cited by examiner

ESCALATOR MONITORING SYSTEM, METHOD, SOUND DATA COLLECTION DEVICE AND FIXTURE THEREFOR

FIELD OF THE INVENTION

The present invention relates to an escalator monitoring system, an escalator monitoring method, a sound data collection device and a fixture used therefor, and particularly, to an escalator monitoring system or an escalator monitoring method that uses data collected by a data collection device to analyze the operating condition of the escalator, a data collection device and a fixture used therefor.

BACKGROUND OF THE INVENTION

Escalators are widely used in a variety of occasions, including shopping centers, office buildings, public facilities, and in other indoor or outdoor environments. Its safe and steady operation requires monitoring operating conditions of relevant parts, and those operating conditions depend heavily on the occasion in which the escalator is running, the temperature, humidity, the amount of dust surrounding it, as well as the passenger traffic thereon and the frequency of use. Thus, every escalator is in different condition and need frequent onsite inspection and maintenance of those relevant parts for proper operation. This involves a great deal of work and makes it difficult for escalator manufactures and users to keep track of its operating condition in an organized fashion.

To solve this issue, an escalator monitoring system need to be improved in such a way that it allows remote monitoring and produces raw data in connection with the parts relevant to steady operation of the escalator. In addition, the system can process and analyze the raw data, promptly determine the operating condition of the escalator, warn of and preempt a possible failure independent of human interference, and provide to the manufacture and the user of the escalator data generated during the its operation for reference.

SUMMARY OF THE INVENTION

A purpose of the present invention is to provide an escalator monitoring system that meets the needs described above, a data collection device, and a fixture used for the monitoring system, and an escalator monitoring method.

According to a first aspect of the present invention, an escalator monitoring system is provided, comprising a data collection device disposed near parts of an escalator that need to be monitored for collecting data of the parts; a data transmittal device used to transmit data relevant to safe operation of the escalator, a cloud processor used to receive the data relevant to the safe operation of the escalator, to compare it against a threshold value stored therein and derived from the parts in normal operating conditions, and to respond to comparison result.

Preferably the data collection device is a sound data collection device, a temperature collection device, a power collection device, or a vibration collection device.

Preferably the escalator monitoring system further comprises a local data processing device, the data relevant to the safe operation of the escalator is data processed by the local data processing device.

Preferably the local data processing device calculates special feature value of the data as the data relevant to the safe operation of the escalator.

Preferably if the comparison result is greater than the threshold value, the local data processing device sends out alarm signals regarding the safe operation of the escalator or sends the comparison result to the cloud processor.

Preferably the cloud processor receives, processes, and compares the data relevant to the safe operation of the escalator, which is the data collected by the data collection device, against the threshold value stored in the cloud processor and derived from the parts in normal operating conditions.

Preferably the cloud processor calculates the special feature value of the data as the data relevant to the safe operation of the escalator, and compares it against the threshold value stored therein and derived from the parts in normal operating conditions.

Preferably if the comparison result is greater than the threshold value, the cloud processor sends out alarm signals regarding the safe operation of the escalator and triggers a customer service system or directly communicates with maintenance personnel to conduct lubrication maintenance.

Preferably the cloud processor includes an escalator database, history operation data of the escalator, the specification of the escalator, and its maintenance history stored therein.

Preferably the cloud processor compares the processed data and the threshold value via means such as statistics, analytics, artificial intelligence, and machine learning.

Preferably the cloud processor saves the data of the parts relevant to the safe operation of the escalator.

Preferably if the comparison result is greater than the threshold value, the cloud processor sends out alarm signals regarding the safe operation of the escalator and triggers a customer service system or directly communicates with maintenance personnel to conduct lubrication maintenance.

Preferably the local data processing device is a micro-computer or a DSP chip.

Preferably the micro-computer sends the data to the cloud processor via a wireless network.

Preferably the data collection device is a sound data collection device, and the local data processing device obtains through a band-pass filter sound data of the parts relevant to the safe operation of the escalator within range of $[F_L, F_H]$, calculates root-mean-square (RMS) value of the data, and sends the RMS value to the cloud processor where it is compared against a sound data threshold value of the metal parts derived when the metal parts operate in normal operating conditions and stored in the database of the cloud processor.

Preferably the data collection device is a sound data collection device disposed near the contact position of parts, that is, a drive and a drive chain, a drive chain and a drive chain sprocket or a step guide pad and a skirt panel, and used to calculate the special feature value of the data and send the special feature value to the cloud processor to compare it against a sound data threshold value of the metal parts derived when the parts operate in normal operating conditions and stored in the database of the cloud processor.

Preferably the data collection device is a sound data collection device, and the cloud processor receives the data sent from the data collection device, obtains through a band-pass filter data of contacting parts relevant to the safe operation of the escalator within the range of $[F_L, F_H]$, calculates the root-mean-square (RMS) value of the data, and compares the RMS value against a sound data threshold value of the metal parts derived when the parts operate in normal operating conditions and stored in the database of the cloud processor.

Preferably the data collection device is a sound data collection device, and the cloud processor receives the sound data sent from the data collection device, computes the special feature value of the data, and compares the special feature value against a sound data threshold value of the parts derived when the parts operate in normal operating conditions and stored in the database of the cloud processor.

Preferably if the sound data comes from a set of escalators of the same location and possesses similar sound data patterns, the local data processing device may choose only one of the sound data for processing.

Preferably the data collection device is a temperature sensor assembly used to detect ambient temperature and temperature of back surface of the handrail of an escalator when it is turned off, in idling condition, or in full operating condition, the data transmittal device receiving the ambient temperature and the handrail back surface temperature from the temperature sensor assembly and transferring the ambient temperature and the handrail back surface temperature to the local data processing device or the cloud processor in a predetermined frequency, the local data processing device or the cloud processor compares the ambient temperature with the handrail back surface and obtains the temperature difference between the ambient temperature and the handrail back surface, and wherein a predetermined temperature difference threshold is stored in the local data processing device or the cloud processor and if the temperature difference between the ambient temperature and the handrail back surface temperature exceeds the predetermined temperature difference threshold, the local data processing device or the cloud processor will send an alarm signal.

Preferably the data collection device is a temperature sensor assembly used to detect ambient temperature and the temperature of the back surface of the handrail of an escalator in a predetermined period, the data transmittal device sending the detected ambient temperature and the temperature of the back surface of the handrail to the local data processing device or the cloud processor, which compares between the ambient temperature and the temperature of the back surface of handrail, and obtains a first mean value and a first variance of the temperature difference in the first predetermined period of time of them.

Preferably the temperature sensor assembly further collects ambient temperatures and temperatures of the back surface of the handrail during another predetermined period of time, the data transmittal device sending the detected ambient temperature and the temperature of the back surface of the handrail to the local data processing device or the cloud processor, which compares between the ambient temperature and the temperature of the back surface of handrail, and obtains a second mean value and a second variance of the temperature difference in another predetermined period of time of them.

Preferably the local data processing device or the cloud processor is configured to send a first alarm signal when the difference between the first mean value and the second mean value is k times greater than the first variance, wherein k is an integer greater than 1 set in the local data processing device or the cloud processor.

Preferably the local data processing device or the cloud processor further determines relation between the first variance and a predetermined first threshold and relation between the second variance and a predetermined second threshold and if the first variance is smaller than the first threshold and the second variance is smaller than the second threshold, the local data processing device or the cloud processor will send a second alarm signal.

Preferably the data collection device is a people traffic sensor for detecting the people traffic entering the escalator in a unit time, and an power sensor for detecting the power consumption in a unit time, a data transferring unit transfers the people traffic detected in a unit time and the power consumption detected in a unit time to the local data processing device or the cloud processor, the local data processing device or the cloud processor determines the running condition of the escalator according to the relation between the people traffic in a unit time and the power consumption in a unit time to determine whether or not an alarm signal needs to be sent.

Preferably the local processing device or the cloud processor calculates a ratio between the power consumption in a unit time and the people traffic in a unit time and if the ratio changes abnormally, the local processing device or the cloud processor will send an alarm signal and if the ratio does not changes abnormally but has a tendency to increase in a predetermined time and is greater than a predetermined threshold, the local processing device or the cloud processor will send an alarm signal.

Preferably the escalator is in a standby running condition, the power sensor detects an average power in a predetermined period and if the average power is not in a predetermined threshold range stored in the local data processing device or the cloud processor, the local data processing device or the cloud processor will send an alarm signal.

Preferably the local data processing device or the cloud processor is further configured that in a period beyond a predetermined threshold period, if the people traffic sensor detects that the people traffic is 0 and the power sensor detects that the power consumption is not matched to a set power consumption when the people traffic is 0, the local data processing device or the cloud processor will send an alarm signal.

Preferably the local data processing device or the cloud processor is further configured that in a period beyond a predetermined threshold period, if the people traffic sensor detects that the people traffic is not 0 and the power sensor detects that the power consumption is a standby power output, the local data processing device or the cloud processor will send a alarm signal.

According to a second aspect, an escalator monitoring system is provided, comprising a sound data collection device disposed parts of an escalator that need to be monitored for collecting data of the parts; a local data processing device used to process sound data locally, to transmit the sound data to a cloud processor, or to respond to result after the sound data is locally processed.

According to a third aspect, an escalator monitoring system is provided, comprising a cloud processor used to receive sound data sent from a remote data collection device disposed near parts of an escalator that need to be monitored, to process the sound data, and to respond to the result after the data is processed.

According to a fourth aspect, a sound data collection device includes a circuit board, one or more digital microphones, and a circuit box enclosing the circuit board and the digital microphones, the circuit box comprising a top wall, a bottom wall, and side walls, and at least one of the top and bottom walls having a sound picking hole therein.

Preferably a water-resistant membrane is arranged on the inner or outer side of the wall in which the sound picking hole is located in order to prevent water or humidity from entering into the digital microphones.

Preferably the digital microphones are arranged on the inner side of the wall in which the sound picking hole is located, below the water-resistant membrane, or on the circuit board.

According to a fifth aspect, a fixture for the temperature collection device for the escalator monitoring system is provided, wherein the installation position of the fixture is adjustable based on a drive mode of the handrail.

Preferably the fixture is installed on a C-profile component on the skirt panel of an escalator if the handrail is in a friction-wheel drive mode.

Preferably the fixture comprises a bracket and an adjustable plate, the adjustable plate being installed on the bracket, the bracket being installed on the C-profile component of the skirt panel, the temperature sensor assembly being installed on an end of the adjustable plate far from the C-profile component.

Preferably one of the adjustable plate and the bracket has a first elongated hole extending along the length direction and in that the other has an opening, a connection device passing through the first elongated hole and the opening to connect the adjustable plate and the bracket and to adjust distance between the temperature sensor assembly and the C-profile component along the length direction based on alignment positions of the opening relative to the first elongated hole along the length direction.

Preferably the fixture is installed on a pillar of an escalator if the handrail is in a newel-wheel drive mode.

Preferably the fixture comprises a bracket and an adjustable plate, the adjustable plate being installed on the bracket, the bracket being installed on the pillar, the temperature sensor assembly being installed on an end of the adjustable plate far from the pillar.

Preferably one of the adjustable plate and the bracket has a second elongated hole extending along the width direction and in that the other has a third elongated hole extending along the length direction, a connection device passing through the second and third elongated holes to connect the adjustable plate and the bracket and to adjust distance between the temperature sensor assembly and the pillar along the length direction and distance between the temperature sensor assembly and the handrail along the width direction based on alignment positions of the second and third elongated holes.

According to a sixth aspect, an escalator is provided comprising an escalator monitoring system as above, a sound data collection device as above and/or a fixture as above.

According to a seventh aspect, a monitoring method for an escalator is provided, including the following steps:

using a temperature sensor assembly to detect a handrail back surface temperature when the escalator is in at least one of a closed down condition, a standby speed running condition and a full speed running condition and ambient temperature;

using a data transferring unit to receive the ambient temperature and the handrail back surface temperature from the temperature sensor assembly and transfer the ambient temperature and the handrail back surface temperature to a local data processing device or a cloud processor in a predetermined frequency;

wherein the local data processing device or the cloud processor compares the ambient temperature with the handrail back surface and obtains the temperature difference between the ambient temperature and the handrail back surface, and wherein a predetermined temperature difference threshold is stored in the local data processing device or the cloud processor and if the temperature difference between the ambient temperature and the handrail back surface temperature exceeds the predetermined temperature difference threshold, the local data processing device or the cloud processor will send an alarm signal.

Preferably the method further comprises: using the local data processing device or the cloud processor to capture the handrail back surface temperature and the ambient temperature detected by the temperature sensor assembly in a predetermined period and compare the ambient temperature and the handrail back surface temperature, resulting a first mean value and a first variance of the temperature difference between the ambient temperature and the handrail back surface temperature in the predetermined period.

Preferably the method further comprises: using the local data processing device or the cloud processor to capture the handrail back surface temperature and the ambient temperature detected by the temperature sensor assembly in another predetermined period and compare the ambient temperature and the handrail back surface temperature, resulting a second mean value and a second variance of the temperature difference between the ambient temperature and the handrail back surface temperature in the another predetermined period.

Preferably the local data processing device or the cloud processor is configured that the local data processing device or the cloud processor sends a first alarm signal when the difference between the second mean value and the first mean value is greater than k times the first variance, wherein k, set in the local data processing device or the cloud processor, is an integer greater than 1.

Preferably the local data processing device or the cloud processor further determines the relation between the first variance and a predetermined first threshold and the relation between the second variance and a predetermined second threshold and if the first variance is smaller than the first threshold and the second variance is smaller than the second threshold, the local data processing device or the cloud processor will send a second alarm signal.

According to an eighth aspect, a monitoring method for an escalator is provided, comprising the following steps:

using a people traffic sensor to detect people traffic entering into the escalator in a unit time; using an power sensor to detect the power consumption in a unit time; using a data transferring unit to transfer the people traffic detected in a unit time and the power consumption detected in a unit time to a local data processing device and a cloud processor, wherein the server determines the running condition of the escalator according to the relation between the people traffic in a unit time and the power consumption in a unit time to determine whether or not an alarm signal needs to be sent.

Preferably the local data processing device or the cloud processor calculates a ratio between the power consumption in a unit time and the people traffic in a unit time and if the ratio changes abnormally, the local data processing device or the cloud processor will send an alarm signal and if the ratio does not changes abnormally but has a tendency to increase in a predetermined time and is greater than a predetermined threshold, the local data processing device or the cloud processor will send an alarm signal.

Preferably in the case that the escalator is in a standby running condition, the power sensor detects an average power in a predetermined period and if the average power is not in a predetermined threshold range stored in the local data processing device or the cloud processor, the local data processing device or the cloud processor will send an alarm signal.

Preferably the local data processing device or the cloud processor is further configured that in a period beyond a predetermined threshold period, if the people traffic sensor detects that the people traffic is 0 and the power sensor detects that the power consumption is not matched to a set power consumption when the people traffic is 0, the local data processing device or the cloud processor will send an alarm signal.

Preferably the local data processing device or the cloud processor is further configured that in a period beyond a predetermined threshold period, if the people traffic sensor detects that the people traffic is not 0 and the power sensor detects that the power consumption is a standby power output, the local data processing device or the cloud processor will send an alarm signal.

An escalator monitoring system or an escalator monitoring method according to the present invention can collect data of an escalator and analyze it in any environment, either indoor or outdoor or quiet or noisy, independent of subjective human judgment. It also predicts possible failure without the need to stop the operation of the escalator, saves maintenance time and reduces associated cost, improving its safety and ride comfort.

DETAILED DESCRIPTION OF THE PREFERRED EMBODIMENT

The escalator monitoring system of the present invention prevents failure of an escalator and provides predictive maintenance thereto, and thus reduces labor and cost associated with the maintenance of the escalator, through a data collection device. Located at or near the parts of the escalator in connection with its safety and normal operating condition, the data collection device collects data while the escalator is running, analyzes, predicts, and determines the operating condition of the escalator, and responses to the determined operating condition.

The escalator monitoring system of the invention can monitor, among others, vibration of the drive devices or parts of the escalator, lubrication condition of the key parts of the escalator that are in contact with each other, temperature of the key parts of the escalator, and motor power of the escalator with respect to varying passenger traffic. The drive devices or parts of which vibration need to be monitored include gearboxes and steps. The gearboxes and steps in normal and abnormal operating conditions vibrate differently, and the vibration data reflecting the vibration difference can be used to analyze, predict, and determine the operating condition of the escalator, and thus to provide predictive maintenance. The parts between which the lubrication condition need to be monitored include a drive and a drive chain, the drive chain and a drive chain sprockets, and step guide pads and skirt panels. These parts are metal and move relative to each other. Where the lubrication therebetween is sufficient, these metal parts move smoothly and generates uniform yet soft sound. But when the lubrication runs low or when the parts become rust or dusty, the movement would be less smooth while generating a penetrating noise. Thus, sound data collected from therebetween can be used to monitor the adequacy of the lubrication, and thus to provide predictive maintenance by analyzing, predicting, and determining the operating condition of the escalator. Temperature gauges may be arranged at the key parts of the escalator to monitor their temperature changes, which in turn help to analyze, predict, and determine the operating condition of the escalator, and thus to provide predictive maintenance. The key parts include but are not limited to handrails. The handrails operate normally when their temperature changes in a normal range; otherwise, they might be malfunctioning. Passenger traffic impacts the normal operation of the escalator. High passenger traffic beyond the capacity of the escalator can cause a safety issue. And the passenger traffic can be evaluated based on the motor power of the escalator. Thus, the motor power can be used to analyze, predict, and determine the operating condition of the escalator, and thus to provide predictive maintenance.

The present invention is further described in detail in the embodiments below.

Figure 1:
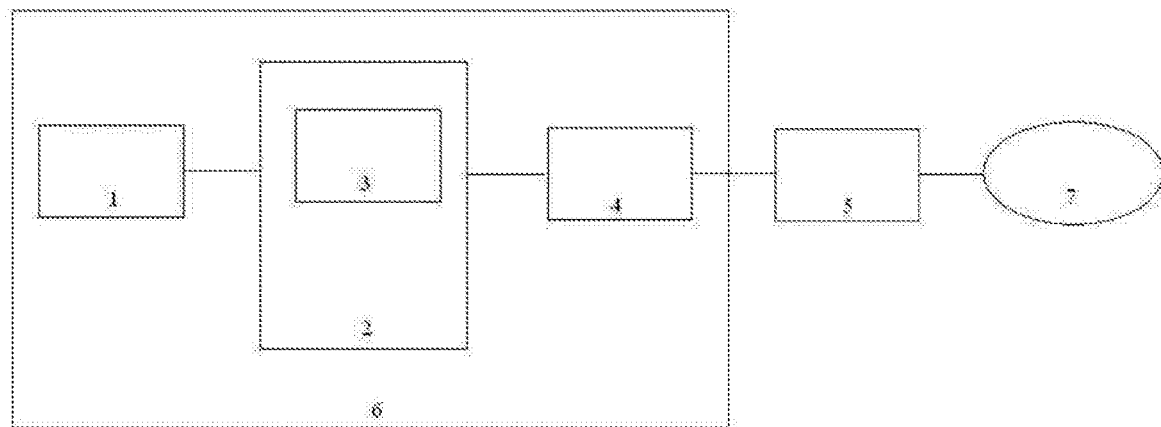
FIG. 1 is a flow chart with respect to the escalator monitoring system in accordance with the first embodiment of the present invention.

FIG. 1 is a flow chart with respect to the escalator monitoring system in accordance with the first embodiment.

In the first embodiment of the present invention, the escalator monitoring device monitors the lubrication condition of an escalator. It uses a data collection device to collect data about the sound generated by the metal parts, to analyze the sound data, and to determine whether the lubrication condition is normal. The data collection device is generally a digital microphone module. It is positioned near contact position between a drive and a drive chain, contact position between the drive chain sprocket and the drive chain of an escalator, or contact position between the skirt panel and the step guide pad under the step front cover, or, if need be, at the position on the truss of an escalator near the contact position between the drive chain and the motor, or any position near parts that are in contact and thus require monitoring. The microphone module may use ordinary microphones commonly used in a cellphone, or ultrasonic microphones. It can record sound waves and support playback function. The digital microphone module continuously collects sound data and saves sound documents, which documents can replay as needed.

In FIG. 1, sound data collection device 1 collects sound data at a contact position between a drive and a drive chain, at a contact position between the drive chain sprocket and the drive chain of the gearbox of an escalator, or at a contact position between the skirt panel and the step guide pad under the step front cover. A sound document containing the sound data is saved at local data processing device 2 of local device 6, and processed through band-pass filter 3. The document is then sent via sound data transmittal device 4 to cloud processor 5.

At the band-pass filter 3, the sound data is denoised so that sound data within certain frequency range $[F_L$ to $F_H]$ is obtained. Usually, $F_L$ is about 1000-5000 Hz, and $F_H$ is above 10000 Hz, because sound data within that range is highly likely relevant to noises produced by friction between metals. This process can be done with Spectrogram function spectrograph.

Figure 2:
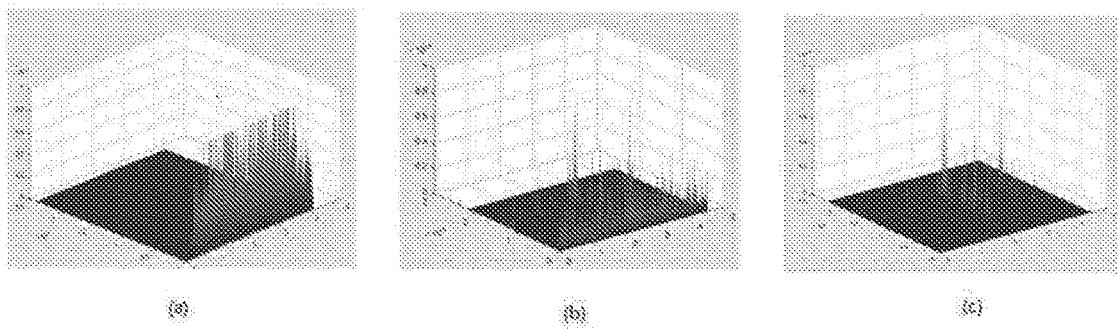
FIG. 2 is a Spectrogram function spectrograph that exemplarily illustrates the process of denoising low-frequency and high frequency noises with the band-pass filter.

FIG. 2 is a Spectrogram function spectrograph that exemplarily illustrates the process of denoising low-frequency and high frequency noises with the band-pass filter. FIG. 2(a) shows sound signals generated by contact between a normal chain without rust and a chain sprocket, which mainly focus on low-frequency range. FIG. 2(b) shows sound signals generated by contact between a rusty chain and a chain sprocket, which mainly are a mix of low-frequency noises and high-frequency peaks. FIG. 2(c) shows a sound pattern separated after applying the band-pass filter with frequency range of [5000, 15000] and retaining only those relevant to the extent of rust existed on the chain.

The next step is to calculate Key Performance Index (KPI) of the filtered sound data. The KPI relevant to the noise generated by contact between metal components may be root-mean-square (RMS) value of the sound data. In this embodiment, a RMS value is used to calculate the peak value of the filtered sound data.

Figure 3:
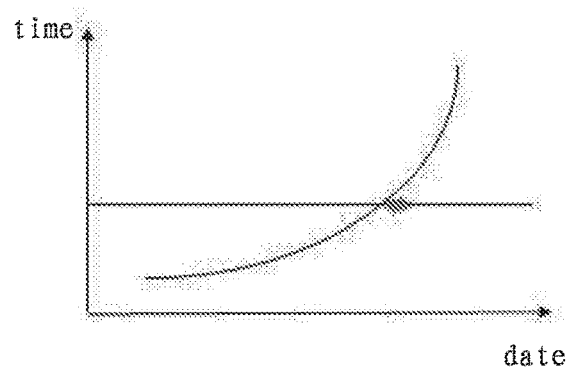
FIG. 3 illustrates the comparison between the calculated RMS value of the sound data and the threshold value in the first embodiment.

The RMS value is sent to the cloud processor 5 via the sound data transmittal device 4. At the cloud processor 5, a comparison is made between the RMS value a predetermined threshold value. If the RMS is higher, the cloud processor responses by sending alarm signals to customer service center, or by direct communicating with maintenance personnel to conduct lubrication maintenance. The comparison is exemplarily illustrated in FIG. 3.

The predetermined threshold value may be obtained by testing under various lubrication conditions, or by other kinds of experiments.

Figure 4:
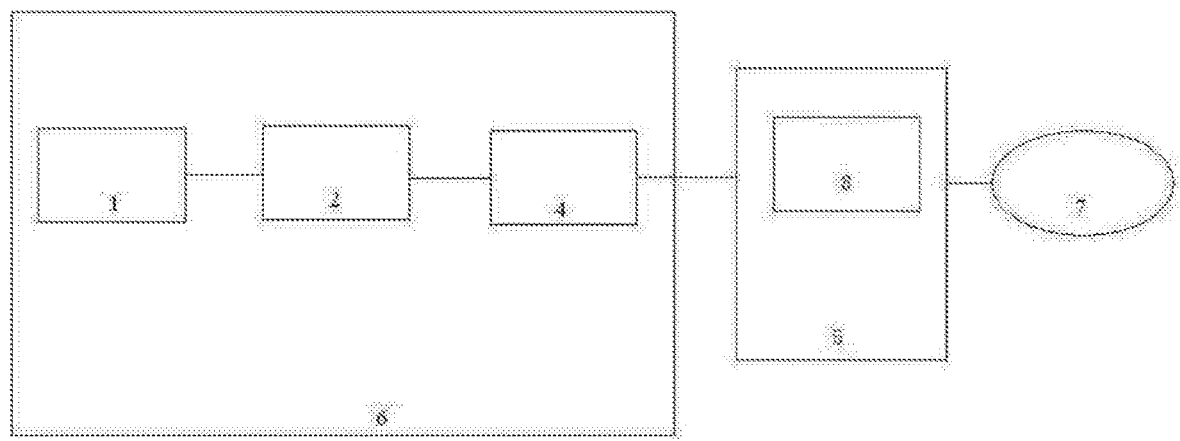
FIG. 4 is a flow chart with respect to the escalator monitoring system in accordance with the second embodiment of the present invention.

FIG. 4 is a flow chart with respect to the escalator monitoring system in accordance with the second embodiment.

In the second embodiment, data collection device 1 collects sound data at the contact position between the drive and the drive chain, at the contact position between the drive chain sprocket and the drive chain of the gearbox of an escalator, or at the contact position between the skirt panel and the step guide pad under the step front cover. A sound document containing the sound data is saved at local data processing device 2 of local device 6. The local data processing device 2 calculates the special feature value of the sound data, which is then sent via sound data transmittal device 4 to cloud processor 5.

Figure 5:
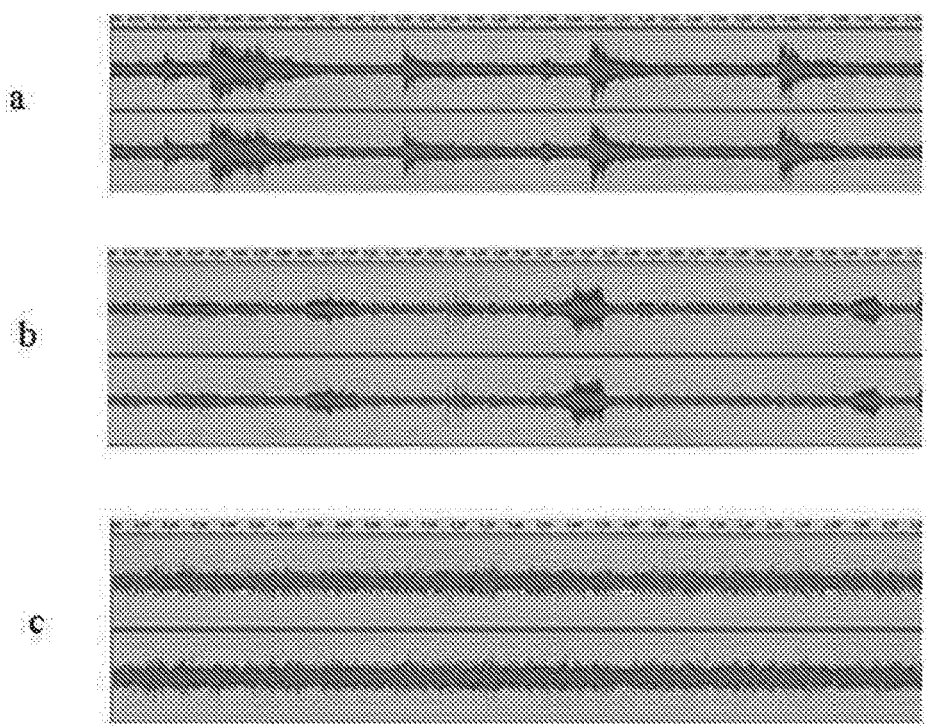
FIG. 5 shows sound data patterns of failures of different types.

FIG. 5 shows comparisons between sound data of different failure types. FIG. 5(a) shows a sound data pattern produced when step misalignment occurs, FIG. 5(b) shows that produced by rusty drive chains, and FIG. 5(c) shows a sound data pattern when an escalator is in normal operating condition. Apparently, different types of failure sound data have different patterns and, thus, different special feature values.

In this embodiment, the local data processing device 2 calculates the special feature value of sound data. The special feature value may be zero crossing rate, energy, entropy of energy, spectral centroid, spectral spread, spectral entropy, spectral flux, spectral rolloff, MFCC, chroma vector or chroma deviation.

The calculated special feature value then is sent to the cloud processor 5 via the data transmittal device 4. At the cloud processor 5, classifier 8 is trained with history or saved sound data of different failure types. The classifier 8 employs neural network algorithm and adjusts special feature vectors to better represent special feature values of different failure types.

Figure 6:
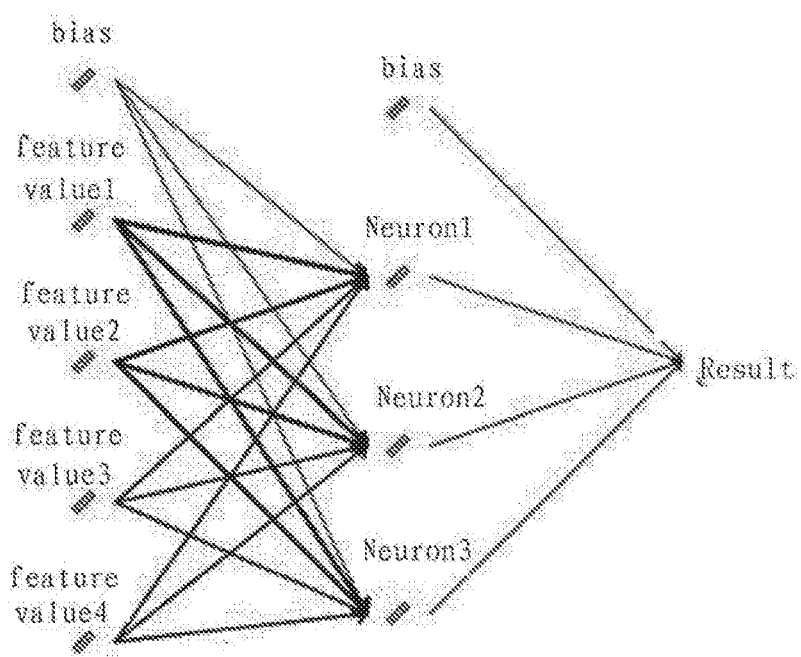
FIG. 6 is an illustration of the analysis flow of the classifier 8.

FIG. 6 is an illustration of the analysis flow of the classifier 8. The classifier 8 sends the calculated special feature values it received to three neurons. Each neuron analyzes and calculates for each type of failure and outputs predicted confidence interval for each type of failure and result based on the confidence interval, the result indicating whether the type of failure is going to happen.

Figure 7:
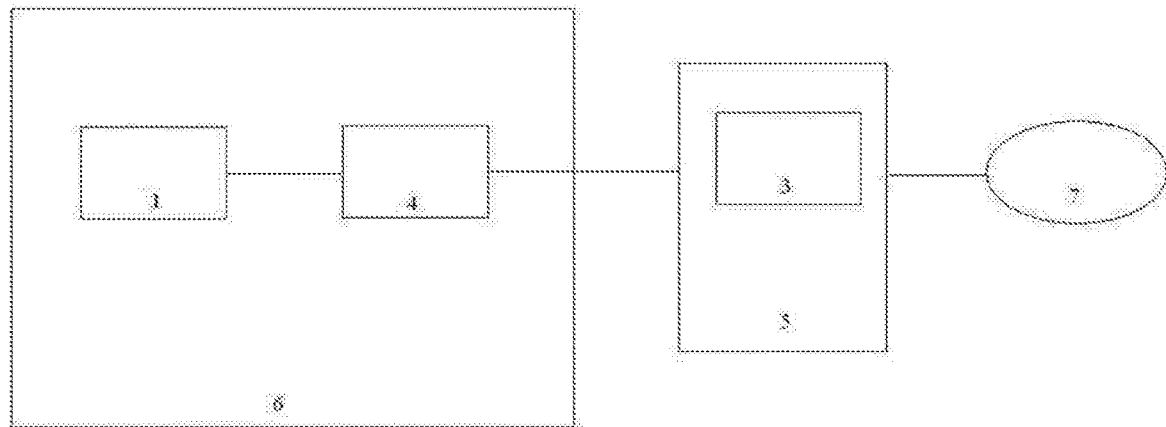
FIG. 7 is a flow chart with respect to the escalator monitoring system in accordance with the third embodiment of the present invention.

FIG. 7 is a flow chart with respect to the escalator monitoring system in accordance with the third embodiment.

In the third embodiment, data collection device 1 collects sound data at the contact position between the drive and the drive chain of an escalator, at the contact position between the drive chain sprocket and the drive chain of an escalator, or at the contact position between the skirt panel and the step guide pad under the step front cover. A sound document containing the sound data is sent via sound data transmittal device 4 to cloud processor 5. At the cloud processor 5, the sound data is denoised by bass-pass filter 3 so that sound data within certain frequency range [$F_L$ to $F_H$] is obtained. Usually, $F_L$ is about 1000-5000 Hz, and $F_H$ is above 10000 Hz. Then the cloud processor 5 calculates Key Performance Index (KPI) of the filtered sound data. The KPI relevant to the noise generated by contact between metal components may be root-mean-square (RMS) value of the sound data. In this embodiment, a RMS value is used to calculate the peak value of the filtered sound data. The cloud processor 5 then compares the RMS value against a predetermined threshold value. If the RMS is higher, the cloud processor responses by sending alarm signals to customer service center, or by direct communicating with maintenance personnel to conduct lubrication maintenance. The comparison is exemplarily illustrated in FIG. 3. The predetermined threshold value may be obtained by testing under various lubrication conditions, or by other kinds of experiments.

Figure 8:
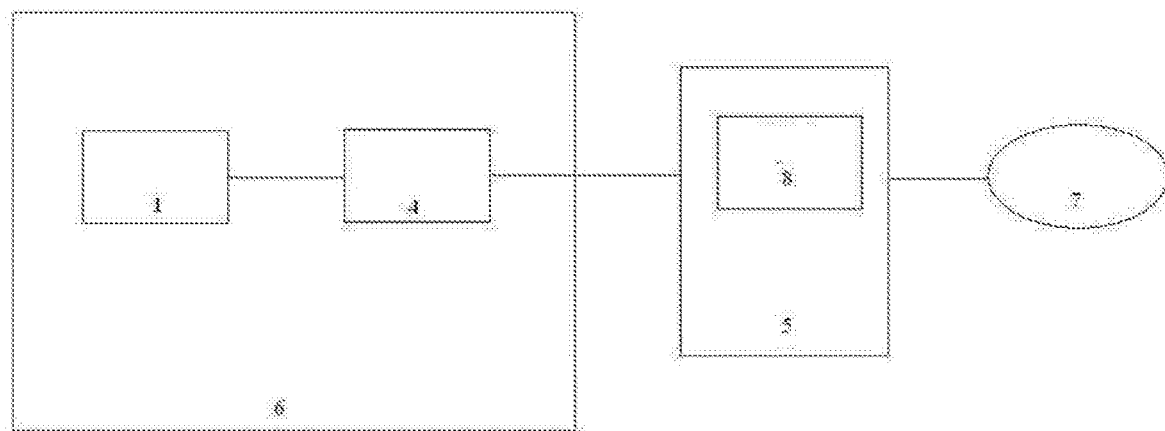
FIG. 8 is a flow chart with respect to the escalator monitoring system in accordance with the fourth embodiment of the present invention.

FIG. 8 is a flow chart with respect to the escalator monitoring system in accordance with the fourth embodiment.

In the fourth embodiment, data collection device 1 is a sound date collection device, which collects sound data at the contact position between the drive and the drive chain, at the contact position between the drive chain sprocket and the drive chain of the gearbox of an escalator, or at the contact position between the skirt panel and the step guide pad under the step front cover. A sound document containing the sound data is sent via sound data transmittal device 4 to cloud processor 5. At the cloud processor 5, special features value of the sound data is calculated. Classifier 8 is trained with history or saved sound data of different failure types. The classifier 8 employs neural network algorithm and adjusts special feature vectors to better represent special feature values of different failure types.

In this embodiment, the cloud processor 5 calculates the special feature values of sound data of different types. The special feature value may be zero crossing rate, energy, entropy of energy, spectral centroid, spectral spread, spectral entropy, spectral flux, spectral rolloff, MFCC, chroma vector or chroma deviation.

FIG. 5 shows comparisons between sound data of different failure types. FIG. 5(*a*) shows a sound data pattern produced when step misalignment occurs, FIG. 5(*b*) shows that produced by rusty drive chains, and FIG. 5(*c*) shows a sound data pattern when an escalator is in normal operating condition. Apparently, different types of failure sound data have different patterns and, thus, different special feature values.

FIG. 6 is an illustration of the analysis flow of the classifier 8. The classifier 8 sends the calculated special feature values it received to three neurons. Each neuron analyzes and calculates for each type of failure and outputs predicted confidence interval for each type of failure and result based on the confidence interval.

The third and fourth embodiments differ mainly from the first and second embodiments in that data processing at the local device 6 in the first and second embodiments takes place at the cloud processor 5 in the third and fourth embodiments. Nonetheless, this may increase cost associated with data transmittal from the local device 6 to the cloud processor 5.

Figure 9:
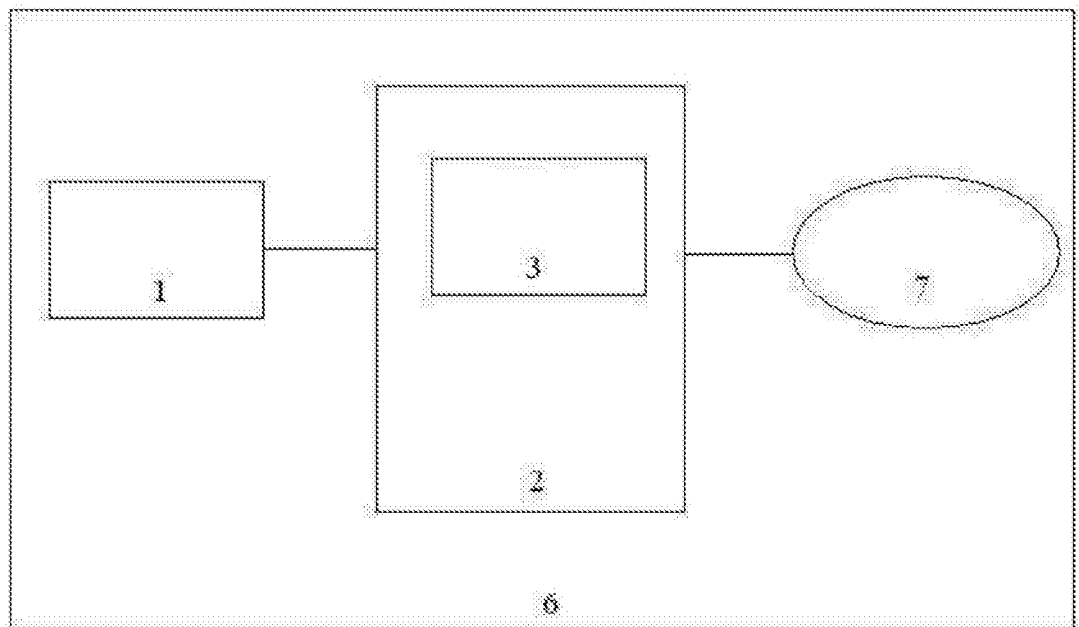
FIG. 9 is a flow chart with respect to the escalator monitoring system in accordance with the fifth embodiment of the present invention.

FIG. 9 is a flow chart with respect to the escalator monitoring system in accordance with the fifth embodiment.

In the fifth embodiment, sound data collection device 1 collects sound data at the contact position between the drive and the drive chain, at the contact position between the drive chain sprocket and the drive chain of the gearbox of an escalator, or at the contact position between the skirt panel and the step guide pad under the step front cover. A sound document containing the sound data is denoised by band-pass filter 3, so that sound data within certain frequency range [$F_L$ to $F_H$] is obtained. Usually, $F_L$ is about 1000-5000 Hz, and $F_H$ is above 10000 Hz. Then local data processing device 2 calculates Key Performance Index (KPI) of the filtered sound data. The KPI relevant to the noise generated by contact between metal components may be root-mean-square (RMS) value of the sound data. In this embodiment, a RMS value is used to calculate the peak value of the filtered sound data. In this embodiment, the local data processing device 2 further compares the RMS value against a predetermined threshold value. The comparison process is exemplarily illustrated in FIG. 3. If the RMS is higher, the local data processing device 2 sends response 7, the response 7 may be alarm signals. The alarm signals are sent to customer service center, or directly communicated with maintenance personnel to conduct lubrication maintenance. The local data processing device 2 may also send the RMS value to a cloud processor only. The predetermined threshold value may be obtained by testing under various lubrication conditions, or by other kinds of experiments.

Figure 10:
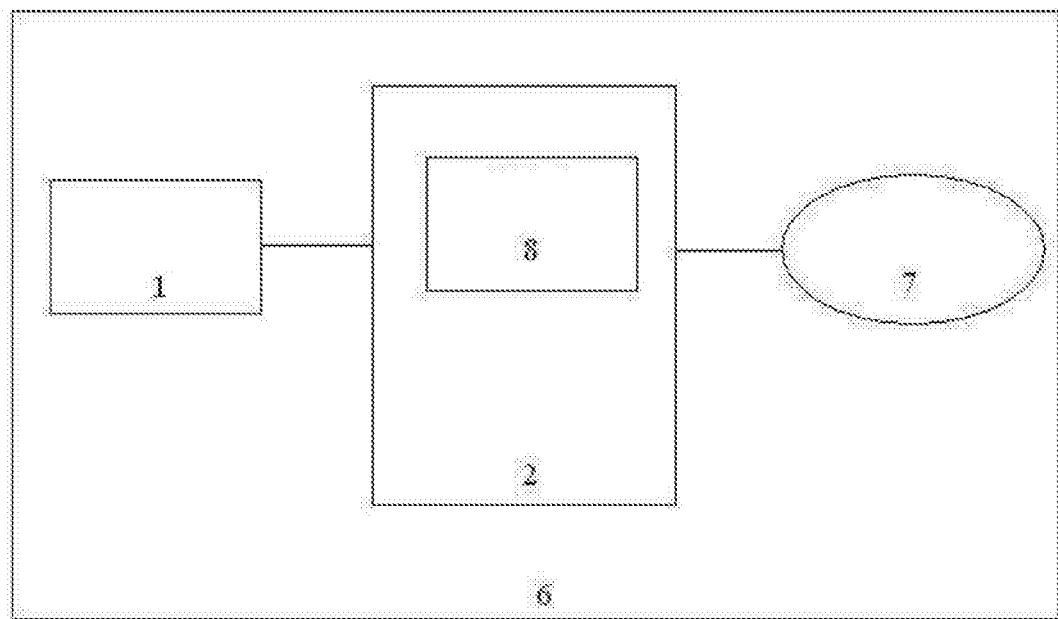
FIG. 10 is a flow chart with respect to the escalator monitoring system in accordance with the sixth embodiment of the present invention.

FIG. 10 is a flow chart with respect to the escalator monitoring system in accordance with the sixth embodiment.

In the sixth embodiment, sound data collection device 1 collects sound data at the contact position between the drive and the drive chain, at the contact position between the drive chain sprocket and the drive chain of the gearbox of an escalator, or at the contact position between the skirt panel and the step guide pad under the step front cover. Local data processing device 2 at local 6 directly calculates special feature value of the sound data. Classifier 8 is then trained with history or saved sound data of different failure types. The classifier 8 employs neural network algorithm and adjusts special feature vectors to better represent special feature values of different failure types. In this embodiment, the special feature value may be zero crossing rate, energy, entropy of energy, spectral centroid, spectral spread, spectral entropy, spectral flux, spectral rolloff, MFCC, chroma vector or chroma deviation.

FIG. 5 shows comparisons between sound data of different failure types. FIG. 5(*a*) shows a sound data pattern produced when step misalignment occurs, FIG. 5(*b*) shows a sound data pattern produced by rusty drive chains, and FIG. 5(*c*) shows a sound data pattern when an escalator is in normal operating condition. Apparently, different types of failure sound data have different patterns and, thus, different special feature values.

FIG. 6 is an illustration of the analysis flow of the classifier 8. The classifier 8 sends the calculated special feature values it received to three neurons. Each neuron analyzes and calculates for each type of failure and outputs predicted confidence interval for each type of failure and result based on the confidence interval. The local data processing device may respond to the result. The response may be alarm signals. The alarm signals may be sent to customer service center, or be directly communicated with maintenance personnel to conduct lubrication maintenance. It is also possible to send the result directly to a cloud processor.

An escalator monitoring system according to the present invention can collect data of an escalator and analyze it in any environment, either indoor or outdoor or quiet or noisy, independent of subjective human judgment. It also predicts possible failure without the need to stop the operation of the escalator, saves maintenance time and reduces associated cost, improving its safety and ride comfort.

Figure 11:
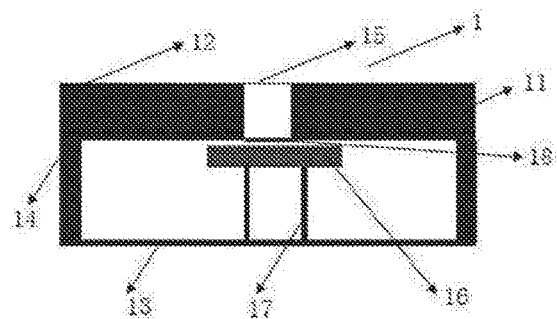
FIG. 11 is the first embodiment of sound data collection device 1 of an escalator monitoring system used in the various embodiments of the present invention.

FIG. 11 is the first embodiment of sound data collection device 1 of an escalator monitoring system used in the various embodiments of the present invention. In this embodiment, the sound data collecting device 1 comprises a sensor circuit box 11. The sensor circuit box 11 comprises a top wall 12, a bottom wall 13, and side walls 14. A sound picking hole 15 is disposed in the top wall 12, the hole 15 being a through hole. The sound data collection device 1 further comprises a sound sensor 16 disposed within the cavity. The sound sensor 16 rests over the bottom wall 13 of the sensor circuit box by means of support 17. A water-resistant membrane 18 is arranged at the opening of the sound picking hole facing the cavity and above the sound sensor 16. The water-resistant membrane prevents water or humidity from entering into the sound data collection device 1, and possesses good sound transmission capability.

Figure 12:
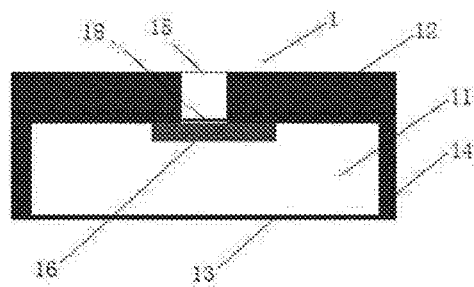
FIG. 12 is the second embodiment of sound data collection device 1 of an escalator monitoring system used in the various embodiments of the present invention.

FIG. 12 is a second embodiment of sound data collection device 1 of an escalator monitoring system used in the various embodiments of the present invention. It differs from the first embodiment in that the sound sensor 16 directly attaches to the top wall 12 of the sensor circuit box 11 at a position below the sound picking hole 15 and the water-resistant membrane 18.

Figure 13:
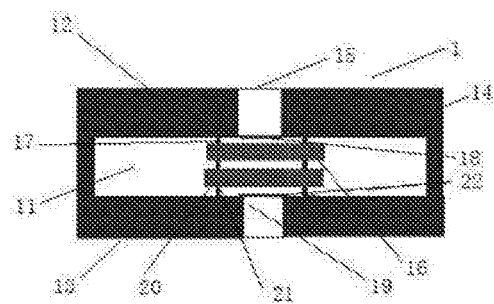
FIG. 13 is the third embodiment of sound data collection device 1 of an escalator monitoring system used in the various embodiments of the present invention.

FIG. 13 is a third embodiment of sound data collection device 1 of an escalator monitoring system used in the various embodiments of the present invention. It differs from the first embodiment in that the sound data collection device 1 is configured as a double-side-used sound data collection device. Its sensor circuit box 11 has two through-hole type sound picking holes 15 and 19 in the top 12 and the bottom 13, respectively, and two sound sensors 16 and 20. The sound sensors rest over the top wall 12 and the bottom wall 13 by means of supports 17 and 21, respectively. Each sound picking hole 15, 19 has a water-resistant membrane 18, 22 attached thereto at the opening facing the cavity.

Figure 14:
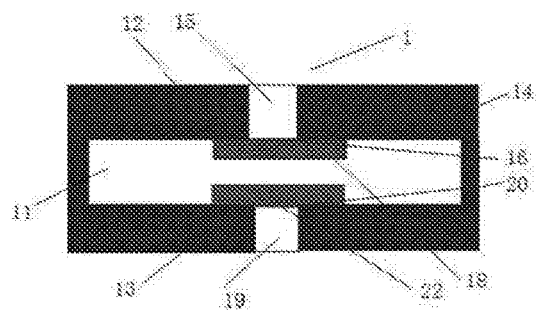
FIG. 14 is the fourth embodiment of sound data collection device 1 of an escalator monitoring system used in the various embodiments of the present invention.

FIG. 14 is the fourth embodiment of sound data collection device 1 of an escalator monitoring system used in the various embodiments of the present invention. It differs from the second embodiment in that the sound data collection device 1 is configured as a double-side-used sound data collection device. Its sensor circuit box 11 has two through-hole type sound picking holes 15 and 19 in the top wall 12 and the bottom wall 13, respectively, and two sound sensors 16 and 20. Each sound sensor directly attaches to the top wall 12 and the bottom wall 13. Each sound picking hole 15, 19 has a water-resistant membrane 18, 22 attached thereto at the opening facing the cavity. Each water-resistant membrane 18, 22 is located between the opening of the sound picking hole 15, 19 facing the cavity and the sound sensor that is attached to the corresponding opening.

Figure 15:
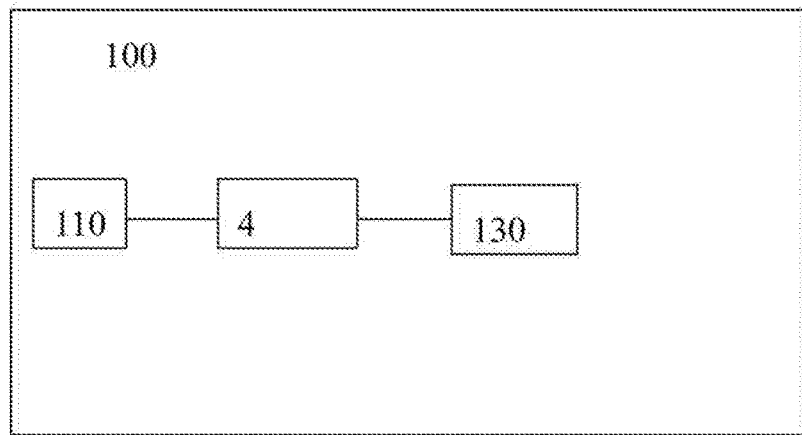
FIG. 15 is a block diagram with respect to the escalator monitoring system in accordance with the seventh embodiment of the present invention.
Figure 16:
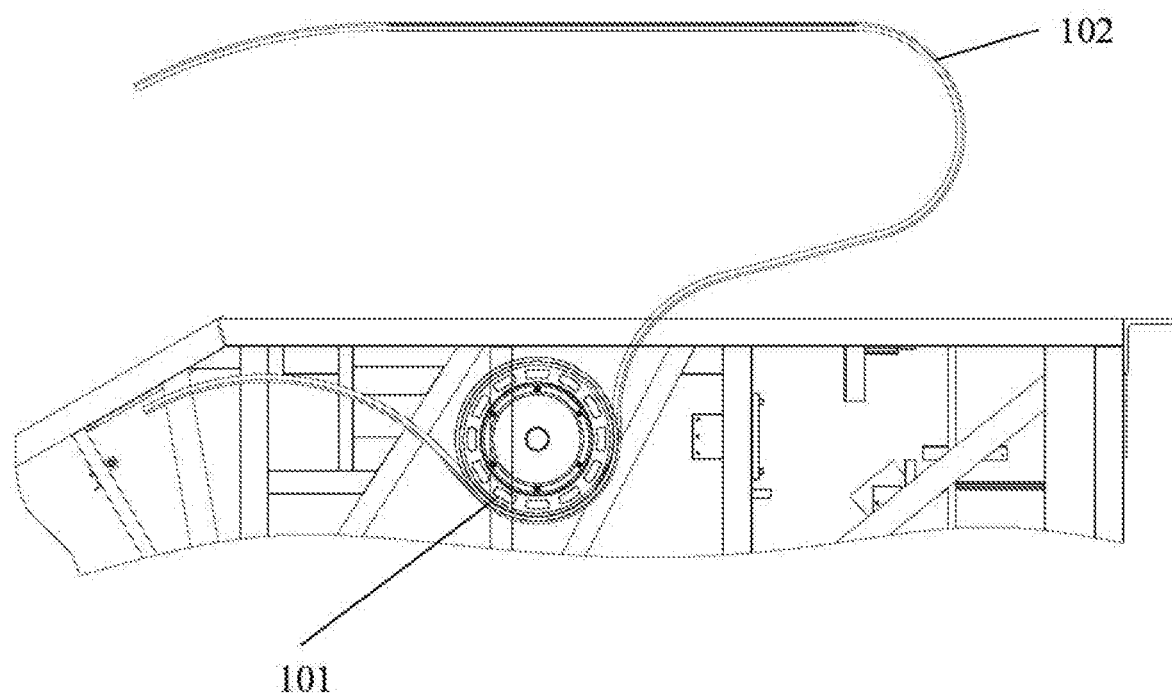
FIG. 16 shows friction-wheel handrail drive mode.
Figure 17:
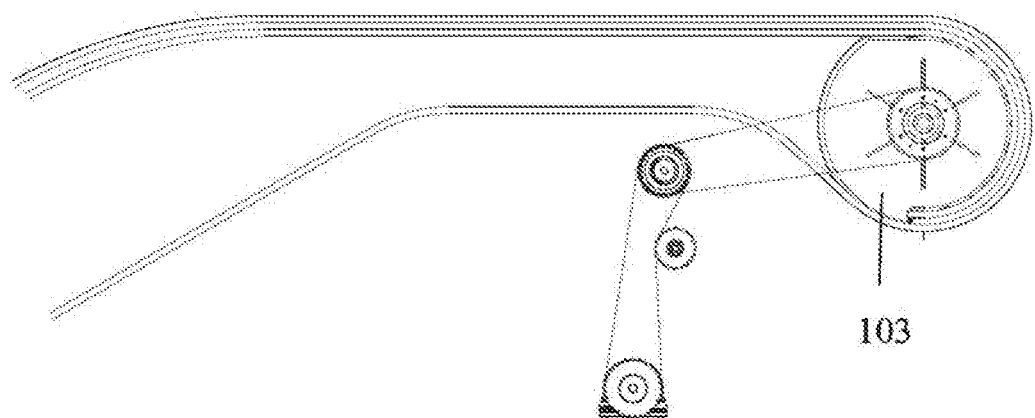
FIG. 17 shows newel-wheel handrail drive mode.
Figure 18:
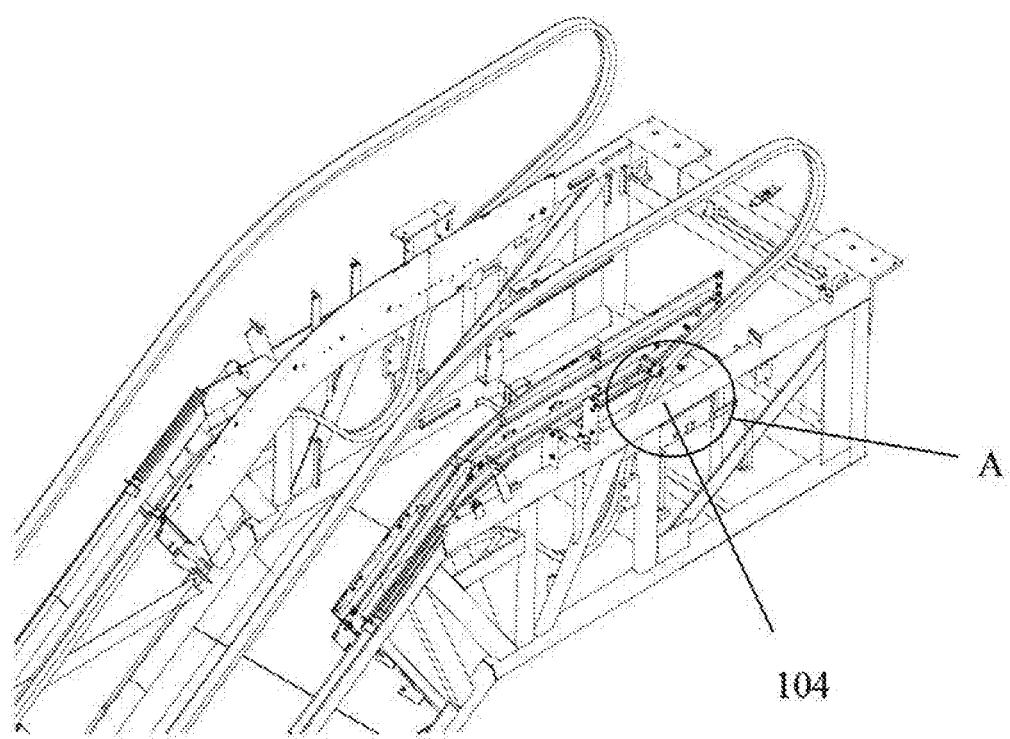
FIG. 18 shows a fixture installed on the C-profile component of the skirt panel under the friction-wheel handrail drive mode.

With reference to FIGS. 15-17, a flow chart of the sixth embodiment with respect to an escalator monitoring system in accordance with the present invention is explained in detail. This embodiment relates to monitoring of temperature of a handrail of an escalator.

FIG. 15 illustrates the block diagram of the escalator monitoring system according to the present invention. The monitoring system 100 comprises temperature sensor assembly 110, data transmittal unit 4, and a server 140. The temperature sensor assembly 110 is used to detect ambient temperature and the temperature of the handrail of an escalator when it is turned off, in idling condition, or in full operating condition. A back surface of the handrail is the surface which directly contact in friction with metal of a friction wheel, a bearing and a guide wheel or guide block of the handrail and a curve section. For example, the temperature sensor assembly 110 includes a handrail temperature sensor used to detect the temperature of the back surface of the handrail and an ambient temperature sensor used to detect the ambient temperature. In general, when the escalator is turned off, the ambient temperature is the same as the temperature of the handrail. Thus, the technical personnel who need to know the operating condition of an escalator concern more about the temperature of the back surface of the handrail and the ambient temperature when the escalator runs in idling and full operating conditions. In this embodiment, the temperature sensor assembly 110 detects the ambient temperature and the temperature of the back surface of the handrail when the escalator is in full operating condition. The processor 120 collects the ambient temperature and the temperature of the back surface of the handrail detected by the temperature sensor assembly, either in wireless manner (e.g., radio frequency, Bluetooth, zigbee) or in wired manner, and transmits the ambient temperature and the temperature of the back surface of the handrail to the server 130 at a predetermined frequency (for example, once per one minute).

The server 130 compares the ambient temperature with the handrail back surface and obtains a temperature difference between the ambient temperature and the handrail back surface, and a predetermined temperature difference threshold is stored in the server, and if the temperature difference between the ambient temperature and the handrail back surface temperature exceeds the predetermined temperature difference threshold, the server will send an alarm signal.

Specifically, the server collects the ambient temperatures and the temperatures of the back surface of the handrail detected by the temperature sensor assembly 110 during a pre-determined period of time t1, and compares the ambient temperatures and the temperatures of the handrail, to obtain a first average value $M_1$ and a first variance $\sigma_1$ of the temperature differences of the ambient temperatures and the temperatures of the back surface of the handrail in the pre-determined period. In addition, the server captures the temperature of the back surface of the handrail and the ambient temperature detected by the temperature sensor assembly in another predetermined period $t_2$ and compare the ambient temperature and the handrail back surface temperature, obtains a second mean value $M_2$ and a second variance $\sigma_2$ of the temperature difference between the ambient temperature and the temperature of the back surface of the handrail in this another predetermined period.

In the next, the server compares the first mean value and the second mean value, and sends a first alarm signal when a difference between the second mean value and the first mean value is k times greater than the first variance ($M_2 > M_1 + k\sigma_1$), wherein k, set in the server, is an integer greater than 1.

Furthermore, the server determines relation between the first variance $\sigma_1$ and a predetermined first threshold $T_1$ and the relation between the second variance $\sigma_2$ and a predetermined second threshold $T_2$ and if the first variance is smaller than the first threshold and the second variance is smaller than the second threshold, that is, $\sigma_1 < T_1$ 且 $\sigma_2 < T_2$, the local data processing device or the cloud processor will send a second alarm signal. Comparing with the first alarm signal, the second alarm signal is more accurate.

FIGS. 16 and 17 illustrate an escalator in frictional-wheel handrail drive mode and newel-wheel handrail drive mode, respectively. In FIG. 16, a friction wheel 101 and the handrail 102 are shown. In FIG. 17, a newel wheel 103 is shown. In these two different handrail drive modes, handrails move along different directions. Because a position to which a fixture for the temperature sensor assembly installs turns on a moving direction of the handrail, installation of the fixture presents different situations in the two handrail drive modes, which are introduced in detail below.

Figure 19:
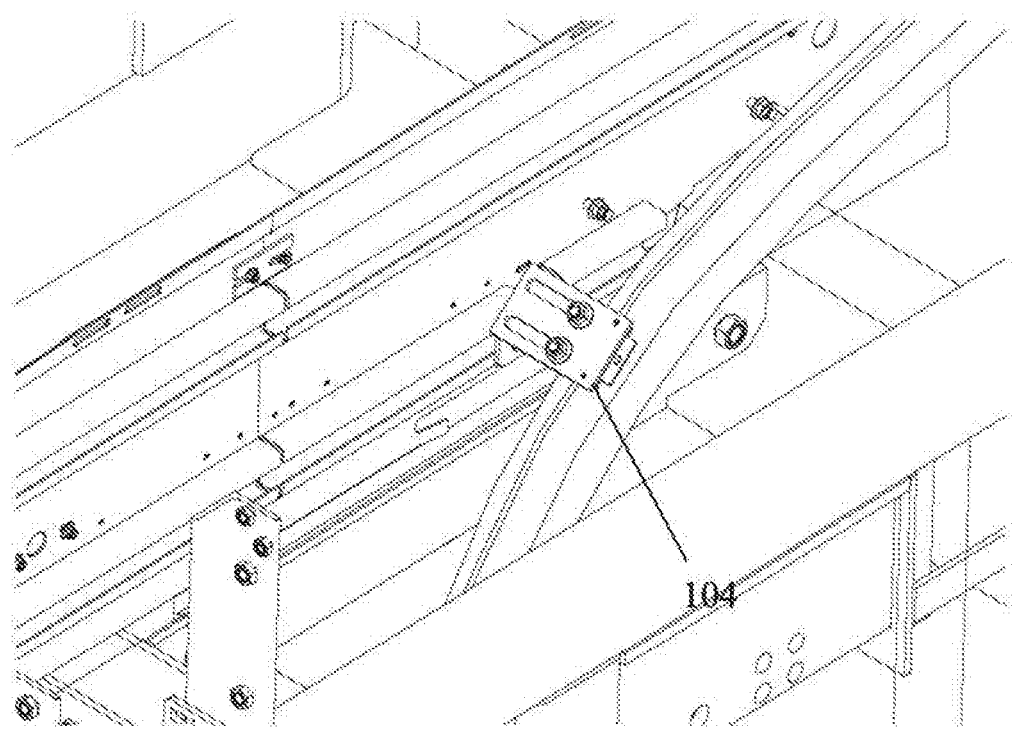
FIG. 19 is an enlarged view of A of FIG. 18.
Figure 20:
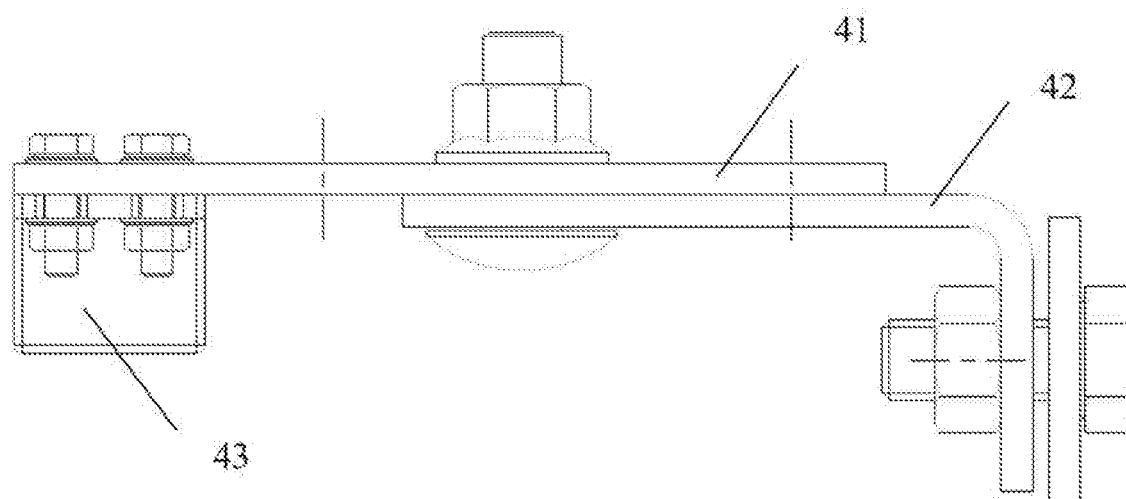
FIG. 20 is an illustration of the fixture of FIG. 18.
Figure 21:
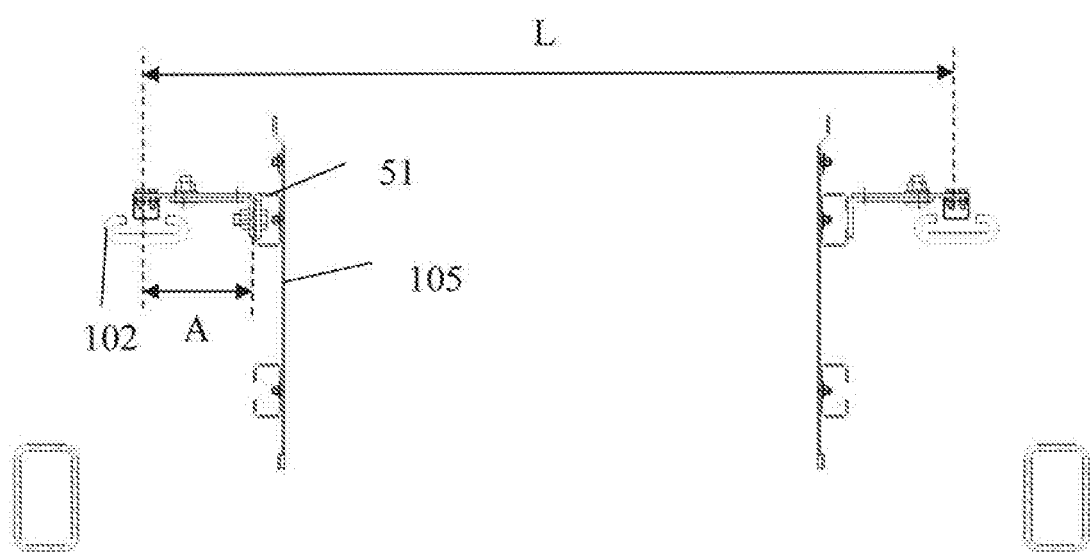
FIG. 21 illustrates a temperature sensor assembly fixed on an escalator by the fixture of FIG. 18.

FIGS. 18-21 demonstrate that the fixture 104 is installed on a C-profile component of the skirt panel in the frictional-wheel handrail drive mode. As shown in FIGS. 19-20, the fixture 104 is installed near the friction wheel and on the C-profile component of the skirt panel. The fixture comprises a bracket 41 and an adjustable plate 42. The adjustable plate 42 is installed on the bracket through connection means such as bolts and nuts. The bracket 41 is installed on the C-profile component of the skirt panel through bolts and nuts. The temperature sensor assembly 43 is installed on the end of the adjustable plate 42 far away from the C-profile component.

One of the adjustable plate 42 and the bracket 41 has a first elongated hole extending along the length direction, and the other has an opening. Bolts may pass through the first elongated hole and the opening, thereby connect the adjustable plate and the bracket, and adjust distance A between the temperature sensor assembly and the C-profile component along the length direction based on the alignment positions of the opening relative to the first elongated hole along the length direction. Thus a handrail center distance L can be changed so as to adapt to different types of escalators.

Figure 22:
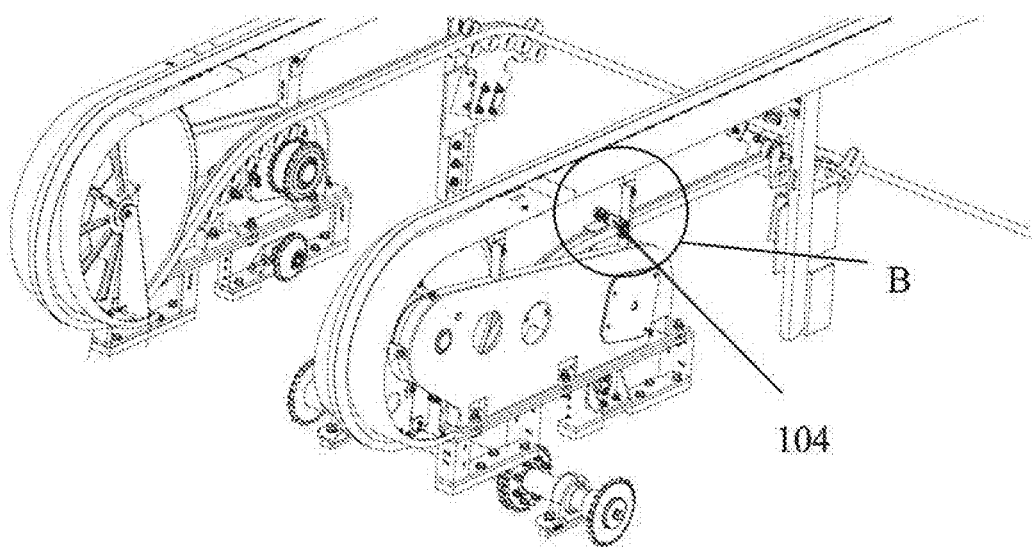
FIG. 22 shows a fixture installed on the pillar under the newel-wheel handrail drive mode.
Figure 23:
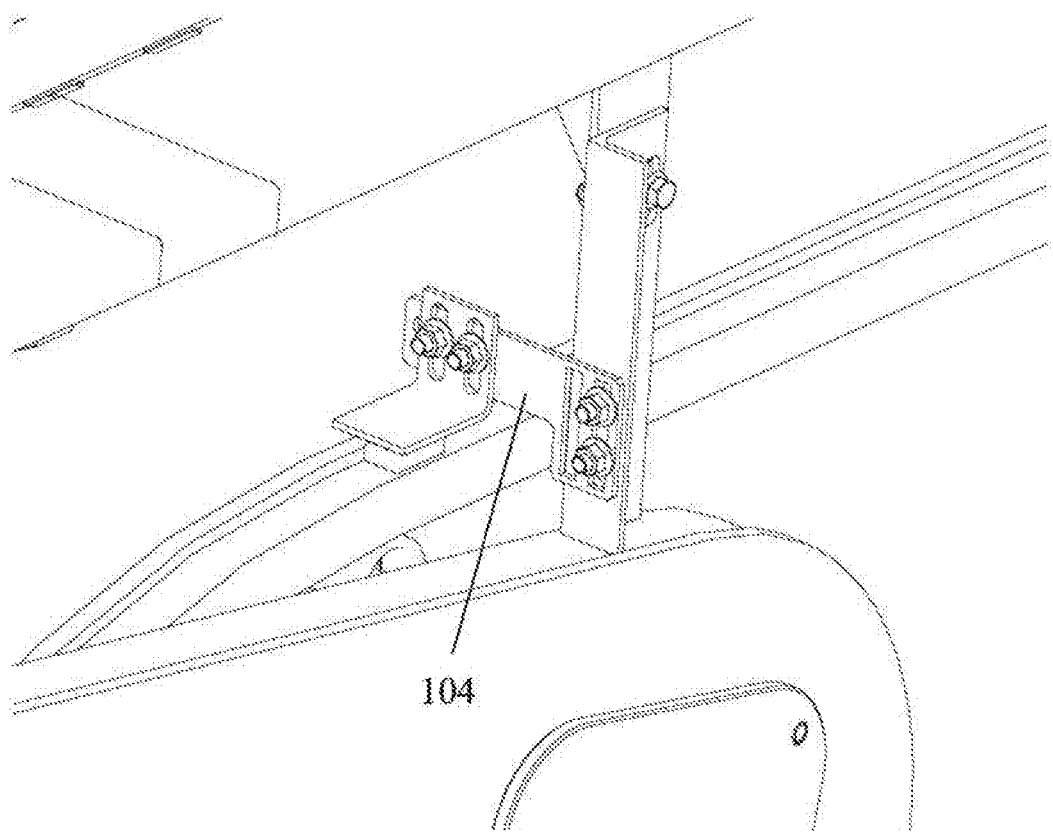
FIG. 23 is an enlarged view of B of FIG. 18.
Figure 24:
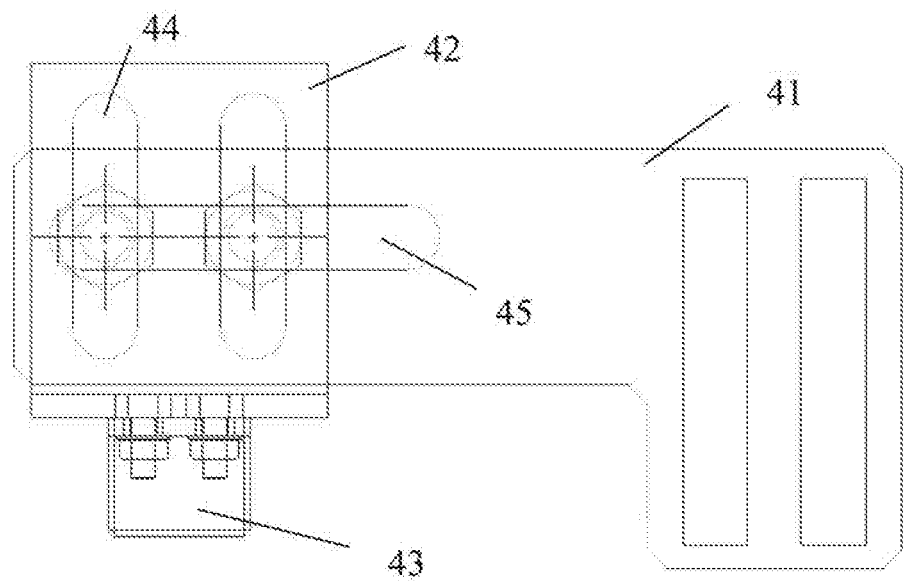
FIG. 24 is an illustration of the fixture of FIG. 22.
Figure 25:
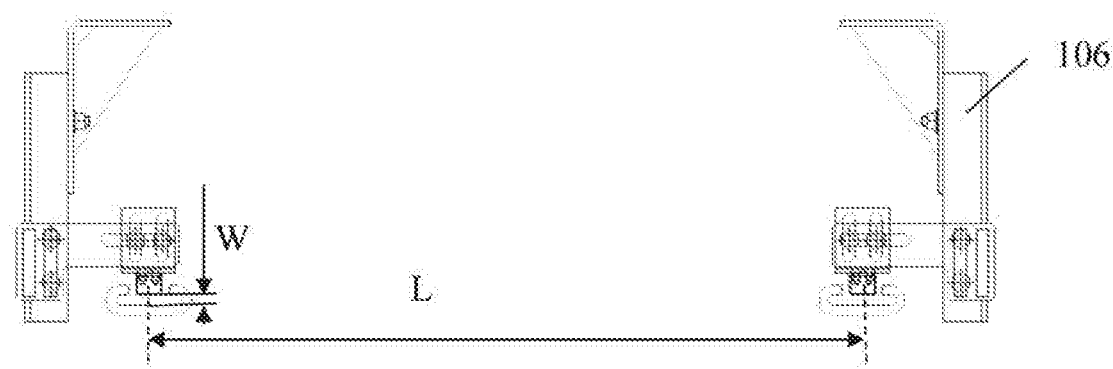
FIG. 25 illustrates a temperature sensor assembly fixed on an escalator by the fixture of FIG. 22.

FIGS. 22-25 demonstrate that the fixture 40 is installed on a pillar in the newel-wheel handrail drive mode. As shown in FIGS. 22-23, the fixture is installed on the pillar. The fixture 40 comprises a bracket 41 and an adjustable plate 42. The adjustable plate 42 is installed on the bracket through connection means such as bolts and nuts. The bracket 41 is installed on the pillar through bolts and nuts. The temperature sensor assembly 43 is installed on the end of the adjustable plate far away from the pillar.

One of the adjustable plate and the bracket has a second elongated hole 44 extending along the width direction perpendicular to the length direction, and the other has a third elongated hole 45 extending along the length direction. Bolts may pass through the second and third elongated holes, and thus connect the adjustable plate and the bracket. They also adjust the distance between the temperature sensor assembly and the pillar along the length direction (handrail center distance L) and the distance between the temperature sensor assembly and the handrail along the width direction W, based on the alignment positions of the second and third elongated holes.

Figure 26:
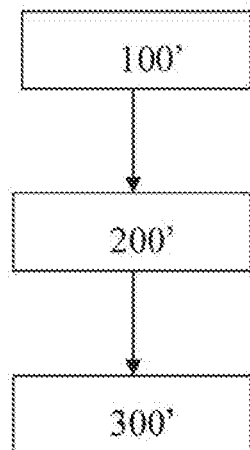
FIG. 26 illustrates a flow chart in accordance with the first embodiment of the monitoring method of the present invention.

FIG. 26 illustrates a flow chart in accordance with the first embodiment of the monitoring method of the present invention. At step 100', the temperature sensor assembly is used to detect ambient temperature and the temperature of the handrail of an escalator when it is turned off, in idling condition, or in full operating condition. At step 200', a data transferring unit is used to receive the ambient temperature and the temperature of the back surface of the handrail from the temperature sensor assembly and transfer the ambient temperature and the handrail back surface temperature to a local data processing device or a cloud processor in a predetermined frequency. At step 300', the server compares the ambient temperature with the handrail back surface and obtains the temperature difference between the ambient temperature and the handrail back surface, and a predetermined temperature difference threshold is stored in the local data processing device or the cloud processor. If the temperature difference between the ambient temperature and the temperature of the back surface of the handrail back surface exceeds the predetermined temperature difference threshold, the server will send an alarm signal.

At step 300', the server further captures the temperature of the back surface of the handrail and the ambient temperature detected by the temperature sensor assembly in a predetermined period and compare the ambient temperature and the temperature of the back surface of the handrail, obtains a first mean value and a first variance of the temperature difference between the ambient temperature and the temperature of the back surface of the handrail in the predetermined period.

At the step 300', the server further captures the temperature of the back surface of the handrail and the ambient temperature detected by the temperature sensor assembly in another predetermined period and compares the ambient temperature and the temperature of the back surface of the handrail, and obtains a second mean value and a second variance of the temperature difference between the ambient temperature and the temperature of the back surface of the handrail in this another predetermined period.

At the step 300', the server is configured that the server sends a first alarm signal when the difference between the second mean value and the first mean value is k times greater than the first variance, wherein k, set in the server, is an integer greater than 1.

At the step 300', the server is further configured the server determines relation between the first variance and a predetermined first threshold and relation between the second variance and a predetermined second threshold, and if the first variance is smaller than the first threshold and the second variance is smaller than the second threshold, the server will send a second alarm signal.

The escalator monitoring system allows real-time monitoring of the operating condition of the handrails. Possible issues can be known in advance, and thus a safer escalator is provided. Furthermore, the real-time monitoring device applies to different installation circumstances of an escalator, and the fixture for the temperature sensor assembly is adjustable. The installation position of the fixture can be adjusted in light of different installation dimensions of various types of escalators.

With respect to FIGS. 27-31, a flow chart with respect to the eighth embodiment of the escalator monitoring system in accordance with the present invention is described in detail. The embodiment relates to monitoring of passenger traffic of the escalator monitoring in accordance with the present invention.

Figure 27:
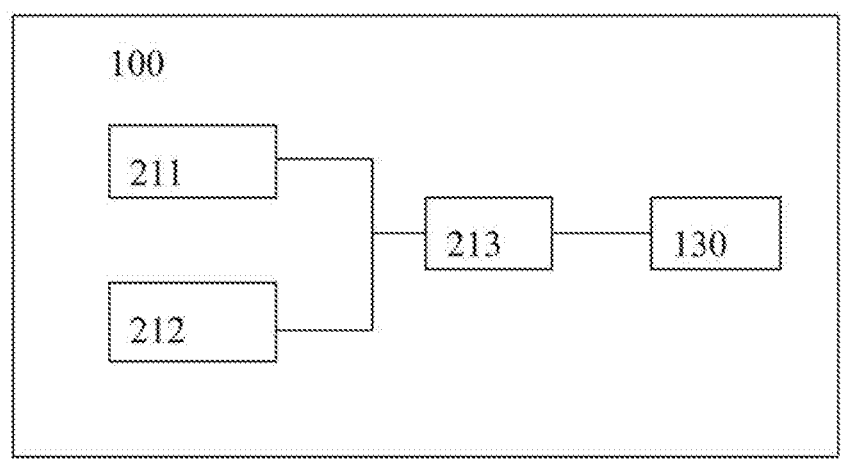
FIG. 27 is a block diagram with respect to the escalator monitoring system in accordance with the eighth embodiment of the present invention.
Figure 28:
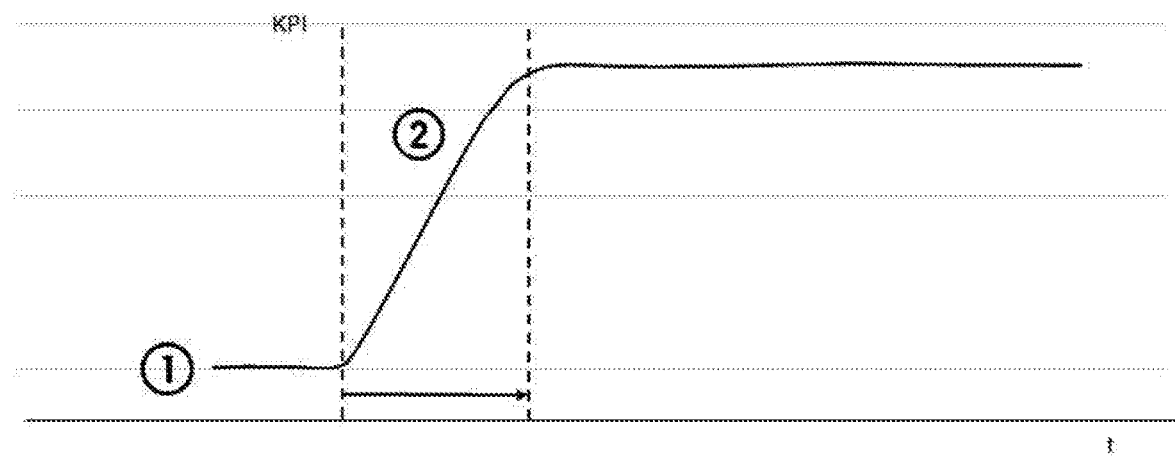
FIG. 28 illustrates the ratio of the power output per unit time to the passenger traffic per unit time.

FIG. 27 is a block diagram of the escalator monitoring system in accordance with the present invention. The monitoring system 100 comprises passenger traffic sensor 211, motor power sensor 212, data transmittal unit 4, and server 130. The passenger traffic sensor 211 is means installed at the entrance of an escalator for emitting light beams in opposing directions, and the frequency of the light beams being interrupted reflects the passenger traffic entering onto the escalator. The motor power sensor 212 is so configured as to detect motor power consumption per unit time. The data transmittal unit 4 collects the passenger traffic and the motor power consumption per unit time, and transmits them to the server 130 by ways such as 2G, 3G, or 4G. The server 130 calculates the ratio (KPI) of the passenger traffic per unit time to the motor power consumption per unit time, and compares the ratio against a pre-determined ratio stored in the server 130. If the ratio KPI shows abnormal changes as compared with the pre-determined ratio, the server predicts the time when the predicted failure will occur and sends out predictive maintenance signals. For example, the numeral "2" shown in FIG. 28 illustrates that the ratio of the passenger traffic per unit time to the motor power per unit time increases suddenly, which indicates that the passenger traffic at that time is not comparable to the motor power consumption and that the escalator is malfunctioning. Persons in the art will appreciate that the passenger traffic per unit time is a ratio of whole passenger traffic in a period of time and the time, and the whole passenger traffic in the time should not be too small.

Figure 29:
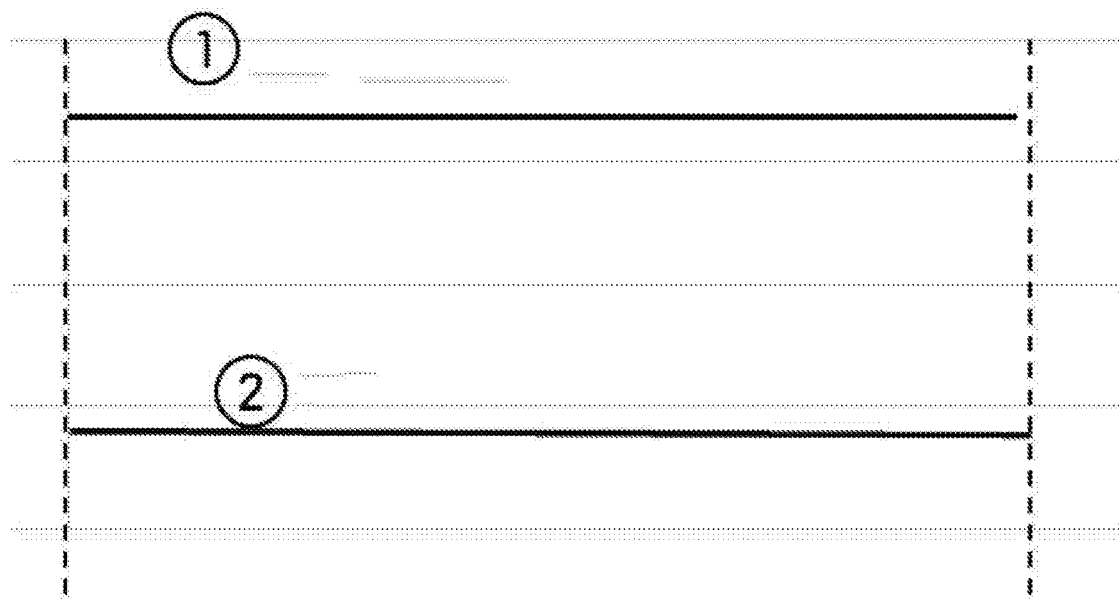
FIG. 29 illustrates a relationship among the real-time monitoring device of the present invention, passenger traffic, and motor power.
Figure 30:
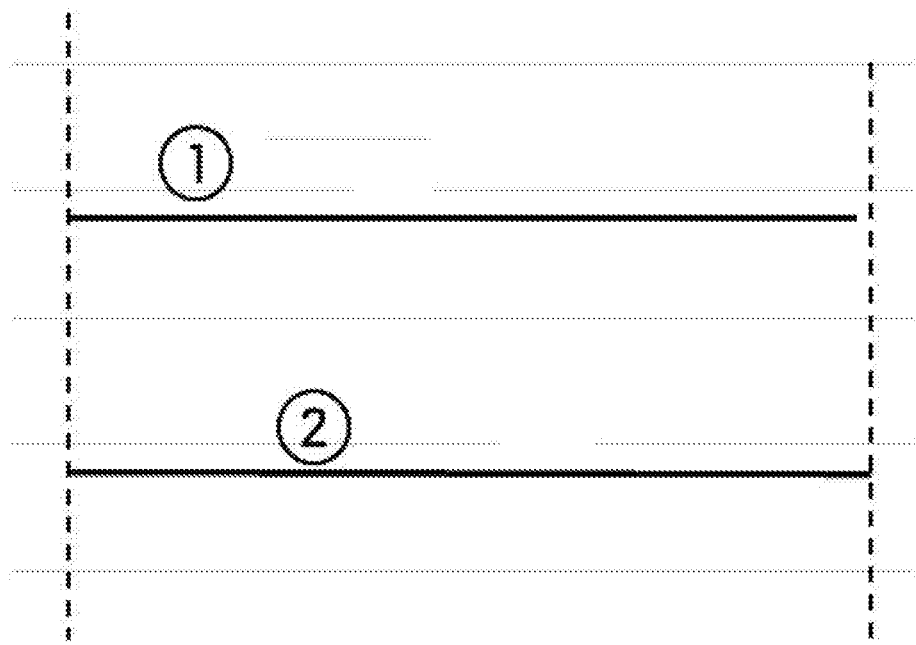
FIG. 30 illustrates another relationship among the real-time monitoring device of the present invention, passenger traffic, and motor power.

FIGS. 29 and 30 show two incomparable relationships between the passenger traffic per unit time and the motor power consumption per unit time, respectively. FIG. 29 illustrates that if the passenger traffic sensor detects no traffic yet the motor power consumption detected by the power sensor is incomparable to a predetermined power consumption under the situation that there is no passenger traffic, the escalator is considered as malfunctioning and the server sends out an alarm signal. FIG. 30 illustrates that if the passenger traffic sensor detects at least some traffic yet the motor power consumption is operating under idling condition during a period of time beyond a pre-determined threshold value, the escalator may suddenly speed up, causing passenger falling down and suffering an injury, and the server sends out alarm signals.

In addition, when there is no passenger traffic, the power sensor detects a mean power consumption in a predetermined period of time. A predetermined threshold range is stored in the server. If the mean power consumption falls into the predetermined threshold range stored in the server, the server sends out an alarm signal.

Figure 31:
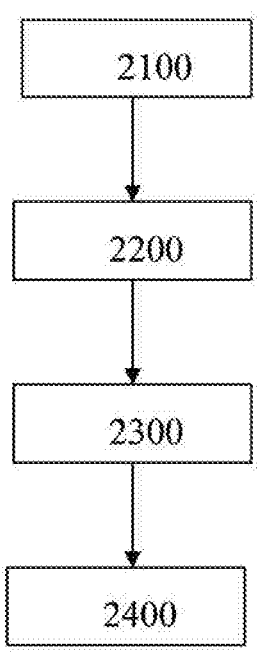
FIG. 31 illustrates a flow chart in accordance with the second embodiment of the monitoring method of the present invention.

FIG. 31 illustrates a flow chart of the second embodiment of the monitoring method of an escalator in accordance with the present invention.

At step 2100, a passenger traffic sensor is used to detect the passenger traffic entering onto an escalator per unit time. At step 2200, a power sensor is used to detect the motor power consumption per unit time. At step 2300, a data transferring unit is used to transfer the people traffic detected in a unit time and the power consumption detected in a unit time to a server. At step 2400, the server determines the running condition of the escalator according to relation between the people traffic in a unit time and the power consumption in a unit time to determine whether or not an alarm signal needs to be sent.

In addition, at step 2400, the server further calculates a ratio between the power consumption in a unit time and the people traffic in a unit time and if the ratio abnormally changes, the server will send an alarm signal and if the ratio does not abnormally changes but has a tendency to increase in a predetermined time and goes beyond a predetermined threshold, the server will send an alarm signal.

In addition, in the case that the escalator is in a standby running condition, at the step 2200, the power sensor detects an average power in a predetermined period, and at the step 2400, if the average power does not fall in a predetermined threshold range stored in the server, the server will send an alarm signal.

At step 2400, the server is further configured that in a period beyond a predetermined threshold period, if the people traffic sensor detects that the people traffic is 0 and the power sensor detects that the power consumption is not comparable to a set power consumption when the people traffic is 0, the server will send an alarm signal.

At step 2400, the server is further configured that in a period beyond a predetermined threshold period, if the people traffic sensor detects that the people traffic is not 0 and the power sensor detects that the power consumption is a standby power output, the server will send an alarm signal.

The real-time monitoring device according to the present invention allows real-time monitoring of the relationship between passenger traffic and power output and is informed of the operating condition of an escalator, thus improving the maintenance of the escalator, ameliorating its energy consumption, and making it safer.

The server mentioned in the specification may be a local server along with the data collection device, or a cloud processor capable of remote monitoring. All data may be processed at the local processor only, or at the cloud processor only, or, as explained in an embodiment above, at the local processor for some of work and then at the cloud processor for the rest. The present invention incorporates herein various embodiments based on these conceptions and is not limited to those embodiments described above.

It is intended that the abovementioned embodiments are exemplary only and shall not be considered as limitations of the present invention. The features in various embodiments may be combined to implement more embodiments of the invention, of which the scope is only determined by the appended claims. A variety of modifications and alterations may be made to the described embodiments without departing the scope of the invention.

What is claimed is:

1. An escalator monitoring system, comprising a data collection device disposed near parts of an escalator that need to be monitored for collecting data of the parts; a data transmittal device used to transmit data relevant to safe operation of the escalator, a cloud processor used to receive the data relevant to the safe operation of the escalator, to compare it against a threshold value stored therein and derived from the parts in normal operating conditions, and to respond to comparison result, wherein the data collection device is a temperature sensor assembly used to detect ambient temperature and temperature of back surface of the handrail of an escalator when it is turned off, in idling condition, or in full operating condition, the data transmittal device receiving the ambient temperature and the handrail back surface temperature from the temperature sensor assembly and transferring the ambient temperature and the handrail back surface temperature to the local data processing device or the cloud processor in a predetermined frequency, the local data processing device or the cloud processor compares the ambient temperature with the handrail back surface and obtains the temperature difference between the ambient temperature and the handrail back surface, and wherein a predetermined temperature difference threshold is stored in the local data processing device or the cloud processor and if the temperature difference between the ambient temperature and the handrail back surface temperature exceeds the predetermined temperature difference threshold, the local data processing device or the cloud processor will send an alarm signal.

2. A fixture for the temperature collection device for the escalator monitoring system according to claim 1, wherein the installation position of the fixture is adjustable based on a drive mode of the handrail.

3. The fixture for the temperature collection device according to claim 2, wherein the fixture is installed on a C-profile component on the skirt panel of an escalator if the handrail is in a friction-wheel drive mode, wherein the fixture comprises a bracket and an adjustable plate, the adjustable plate being installed on the bracket, the bracket being installed on the C-profile component of the skirt panel, the temperature sensor assembly being installed on an end of the adjustable plate far from the C-profile component, wherein one of the adjustable plate and the bracket has a first elongated hole extending along the length direction and in that the other has an opening, a connection device passing through the first elongated hole and the opening to connect the adjustable plate and the bracket and to adjust distance between the temperature sensor assembly and the C-profile component along the length direction based on alignment positions of the opening relative to the first elongated hole along the length direction.

4. The fixture for the temperature collection device according to claim 2, wherein the fixture is installed on a pillar of an escalator if the handrail is in a newel-wheel drive mode, wherein the fixture comprises a bracket and an adjustable plate, the adjustable plate being installed on the bracket, the bracket being installed on the pillar, the temperature sensor assembly being installed on an end of the adjustable plate far from the pillar, wherein the fixture comprises a bracket and an adjustable plate, the adjustable plate being installed on the bracket, the bracket being installed on the pillar, the temperature sensor assembly being installed on an end of the adjustable plate far from the pillar.

5. An escalator monitoring system, comprising a data collection device disposed near parts of an escalator that need to be monitored for collecting data of the parts; a data transmittal device used to transmit data relevant to safe operation of the escalator, a cloud processor used to receive the data relevant to the safe operation of the escalator, to compare it against a threshold value stored therein and derived from the parts in normal operating conditions, and to respond to comparison result, wherein the data collection device is a temperature sensor assembly used to detect ambient temperature and the temperature of the back surface of the handrail of an escalator in a predetermined period, the data transmittal device sending the detected ambient temperature and the temperature of the back surface of the handrail to the local data processing device or the cloud processor, which compares between the ambient temperature and the temperature of the back surface of handrail, and obtains a first mean value and a first variance of the temperature difference in the first predetermined period of time of them, wherein the temperature sensor assembly further collects ambient temperatures and temperatures of the back surface of the handrail during another predetermined period of time, the data transmittal device sending the detected ambient temperature and the temperature of the back surface of the handrail to the local data processing device or the cloud processor, which compares between the ambient temperature and the temperature of the back surface of handrail, and obtains a second mean value and a second variance of the temperature difference in another predetermined period of time of them, wherein the local data processing device or the cloud processor is configured to send a first alarm signal when the difference between the first mean value and the second mean value is k times greater than the first variance, wherein k is an integer greater than 1 set in the local data processing device or the cloud processor, wherein the local data processing device or the cloud processor further determines relation between the first variance and a predetermined first threshold and relation between the second variance and a predetermined second threshold and if the first variance is smaller than the first threshold and the second variance is smaller than the second threshold, the local data processing device or the cloud processor will send a second alarm signal.

6. A monitoring method for an escalator, including the following steps:
 using a temperature sensor assembly to detect a handrail back surface temperature when the escalator is in at least one of a closed down condition, a standby speed running condition and a full speed running condition and ambient temperature;
 using a data transferring unit to receive the ambient temperature and the handrail back surface temperature from the temperature sensor assembly and transfer the ambient temperature and the handrail back surface temperature to a local data processing device or a cloud processor in a predetermined frequency;
 wherein the local data processing device or the cloud processor compares the ambient temperature with the handrail back surface and obtains the temperature difference between the ambient temperature and the handrail back surface, and wherein a predetermined temperature difference threshold is stored in the local data processing device or the cloud processor and if the temperature difference between the ambient temperature and the handrail back surface temperature exceeds the predetermined temperature difference threshold, the local data processing device or the cloud processor will send an alarm signal.

7. The method according to claim 6, wherein the method further comprises: using the local data processing device or the cloud processor to capture the handrail back surface temperature and the ambient temperature detected by the temperature sensor assembly in a predetermined period and compare the ambient temperature and the handrail back surface temperature, resulting a first mean value and a first variance of the temperature difference between the ambient temperature and the handrail back surface temperature in the predetermined period.

8. The method according to claim 7, wherein the method further comprises: using the local data processing device or the cloud processor to capture the handrail back surface temperature and the ambient temperature detected by the temperature sensor assembly in another predetermined period and compare the ambient temperature and the handrail back surface temperature, resulting a second mean value and a second variance of the temperature difference between the ambient temperature and the handrail back surface temperature in the another predetermined period.

9. The method according to claim 8, wherein the local data processing device or the cloud processor is configured that the local data processing device or the cloud processor sends a first alarm signal when the difference between the second mean value and the first mean value is greater than k times the first variance, wherein k, set in the local data processing device or the cloud processor, is an integer greater than 1, wherein the local data processing device or the cloud processor further determines the relation between the first variance and a predetermined first threshold and the relation between the second variance and a predetermined second threshold and if the first variance is smaller than the first threshold and the second variance is smaller than the second threshold, the local data processing device or the cloud processor will send a second alarm signal.

* * * * *